(12) United States Patent
Ueda et al.

(10) Patent No.: US 6,602,628 B2
(45) Date of Patent: Aug. 5, 2003

(54) CONTROL SYSTEM FOR FUEL CELL

(75) Inventors: Kenichiro Ueda, Wako (JP); Katumi Saitou, Wako (JP); Tomoki Kobayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 83 days.

(21) Appl. No.: 09/814,130

(22) Filed: Mar. 22, 2001

(65) Prior Publication Data

US 2001/0024746 A1 Sep. 27, 2001

(30) Foreign Application Priority Data

Mar. 24, 2000 (JP) ......................................... 2000-085293

(51) Int. Cl.[7] .......................... H01M 8/04; H01M 8/12; H01M 2/14
(52) U.S. Cl. ............................. 429/25; 429/17; 429/22; 429/39
(58) Field of Search .............................. 429/12, 13, 17, 429/19, 22, 25, 39

(56) References Cited

U.S. PATENT DOCUMENTS

| | | | | |
|---|---|---|---|---|
| 5,462,815 A | * | 10/1995 | Horiuchi | 429/13 |
| 5,616,430 A | * | 4/1997 | Aoyama | 429/17 |
| 5,964,089 A | * | 10/1999 | Murphy et al. | 60/286 |
| 6,015,634 A | * | 1/2000 | Bonville, Jr. et al. | 429/17 |
| 6,122,909 A | * | 9/2000 | Murphy et al. | 60/286 |
| 6,306,532 B1 | * | 10/2001 | Kurita et al. | 429/20 |
| 6,331,366 B1 | * | 12/2001 | Van Dine et al. | 429/17 |

FOREIGN PATENT DOCUMENTS

| | | |
|---|---|---|
| JP | 57-143269 | 9/1982 |
| JP | 7-272739 | 10/1995 |
| JP | 11-329472 | 11/1999 |

* cited by examiner

*Primary Examiner*—Randy Gulakowski
*Assistant Examiner*—Donald V. Scaltrito
(74) *Attorney, Agent, or Firm*—Arent Fox Kintner Plotkin & Kahn (57) ABSTRACT

A control system for a fuel cell includes a reactant gas supplying unit which supplies a reactant gas to the fuel cell, and a discharged reactant gas flow control unit disposed at an outlet of the fuel cell. The discharged reactant gas flow control unit includes a first control valve and a second control valve disposed in parallel with the first control valve. The second control valve has a different pressure-flow control characteristic as compared with the first control valve. Only the second control valve controls the flow rate of a discharged reactant gas until the flow rate exceeds a predetermined value, and the second control valve together with the first control valve controls the flow rate of the discharged reactant gas when the flow rate of the discharged reactant gas exceeds the predetermined value.

20 Claims, 6 Drawing Sheets

CONTROL SYSTEM FOR FUEL CELL

BACKGROUND OF THE INVENTION

1. Field of the Invention

The present invention relates to a control system for a fuel cell. More specifically, the present invention relates to a control system for a fuel cell which controls a pressure-flow characteristic of a reactant gas which, for instance, is supplied to a fuel cell provided with a reforming device.

2. Description of Related Art

A conventional solid polymer membrane type fuel cell includes a cell in which a solid polymer electrolyte membrane is sandwiched by an anode and a cathode, and a stack is formed by a plurality of laminated cells (hereinafter referred to as a fuel cell). In general, hydrogen is supplied to the anode as a fuel and an air is supplied to the cathode as an oxidizing agent so that hydrogen ions generated at the anode by a catalytic reaction pass through the solid polymer electrolyte membrane and move to the cathode to electrochemically react with oxygen to generate a power.

A fuel cell unit provided with a reforming device is disclosed, which utilizes an alcohol type compound, such as methanol, or a hydrocarbon type compound, such as gasoline, as a raw material and produces a hydrogen-enriched fuel by modifying such raw materials, for instance, in the Japanese Unexamined Patent Application, First Publication No. 11-329472.

In such a fuel cell unit, a pressure-flow control valve for controlling the flow of a fuel discharged from the fuel cell is provided so that a predetermined generation efficiency of the fuel cell may be ensured by setting a predetermined pressure of the anode side of the fuel cell with respect to the cathode side and that a predetermined output is obtained by controlling the flow of the fuel supplied to the fuel cell.

However, in the above-mentioned example of the conventional fuel cell unit, there are problems that, for instance, if an analog control of the pressure-flow control valve is carried out, it is difficult to control the valve in a stable manner and a response thereof cannot be enhanced, although the opening degree of the valve may be continuously varied.

Also, in a case where only one pressure-flow control valve is used, if a digital control is carried out by using, for instance, a stepping motor, it becomes difficult to accurately control the pressure-flow characteristic of the fuel over an entire flow range, from the low output to the high output of the fuel cell, because the opening degree of the valve per one step of the motor is fixed.

The present invention was achieved in consideration of the above problems and its objectives include providing a control system for a fuel cell which is capable of accurately controlling the pressure-flow characteristic of a reactant gas or discharged reactant gas over a wide output range of the fuel cell.

SUMMARY OF THE INVENTION

The present invention provides a control system for a fuel cell, including a reactant gas supplying unit (for instance, the fuel supplying unit 12 or the oxidizing agent supplying unit 17 which will be described later in embodiments of the present invention) which supplies a reactant gas (for instance, a fuel or an oxidizing agent in the following embodiments) to the fuel cell (for instance, the fuel cell 11 in the following embodiments), and a discharged reactant gas flow control unit disposed at an outlet portion of the fuel cell for discharging a discharged reactant gas (for instance, a discharged fuel or a discharged oxidizing agent in the following embodiments) from the fuel cell. The discharged reactant gas flow control unit includes a first control valve (for instance, the large flow valve 28 in the following embodiments); and a second control valve (for instance, the small flow valve 27 in the following embodiments) disposed in parallel with the first control valve, the second control valve having a different pressure-flow control characteristic as compared with the first control valve, wherein only the second control valve controls the flow rate of a discharged reactant gas until the flow rate of the discharged reactant gas exceeds a predetermined value, and the second control valve together with the first control valve controls the flow rate of the discharged reactant gas when the flow rate of the discharged reactant gas exceeds the predetermined value.

In accordance with another aspect of the invention, the first control valve and the second control valve are under digital control so that the opening degree of the first and second control valves may vary in a stepwise manner.

In yet another aspect of the invention, the opening degree of the first control valve per one step is less than or equal to the maximum opening degree of the second control valve.

In yet another aspect of the invention, the first control valve is under feedforward control based on a target value of a pressure-flow characteristic (for instance, the target working pressure, and the flow rate Q1 of a discharge gas in the following embodiment) of a reactant gas or the discharged reactant gas.

In yet another aspect of the invention, the second control valve is under feedback control based on a detected value of pressure-flow characteristic (for instance, the pressure P1, the pressure P2, and the flow rate Q, or the pressure PA, the flow rate QA, the generated current I, and the temperature TA) of the reactant gas or the discharged reactant gas.

According to the control system for a fuel cell having the above-mentioned configuration, in the low flow rate region of the discharged reactant gas, for instance, only the second control valve having a relatively small flow control capacity is used to control the flow and, in the high flow rate of the discharged reactant gas, the first control valve having a relatively large flow control capacity is used in addition to the second control valve to carry out a pressure-flow control of the discharged reactant gas over the entire output range of the fuel cell in an accurate and quick manner.

Also, when a stepping motor having a predetermined number of steps is used as a driving source for the first and second control valves, the first control valve whose opening degree per one step is large is feedforward controlled and the second control valve whose opening degree per one step is small is feedback controlled.

In the low flow rate region of the discharged reactant gas, the first control valve is totally closed and only the second control valve is used to control the pressure-flow characteristic of the reactant gas so that the accuracy to a response may be enhanced.

On the other hand, in the high flow rate region of the discharged reactant gas, the first control valve is subjected to a feedforward control so that the pressure-flow characteristic may be largely varied and, in addition to that, the second control valve is subjected to a feedback control to make adjustment to the changed made by the first control valve. In this manner, it becomes possible to prevent a decrease in accuracy to a response in the high flow rate region of the discharged reactant gas.

In yet another aspect of the invention, the opening degree of the first control valve, which corresponds to the target value of a pressure-flow characteristic of the discharged reactant gas, is determined based on information containing a pressure-flow control characteristic of the first control valve at a predetermined opening degree of the second control valve.

In yet another aspect of the invention, the number of steps for the opening degree of the first control valve is an integer closest to a predetermined approximate value of the target value of a pressure-flow characteristic of the discharged reactant gas, and the second control valve corrects the difference between the opening degree of the first control valve and the predetermined approximate value by a feedback control.

According to the control system for a fuel cell having the above-mentioned configuration, in the high flow region of the discharged reactant gas, for instance, the opening degree of the second control valve may be set at about a half of its maximum opening degree so that it becomes possible to correct in a quick manner the control of the first control valve whose opening degree per one step is relatively large.

In the above mentioned case, there may be a difference between the opening degree of the first control valve whose opening degree per one step is relatively large and the opening degree determined by, for instance, searching through a map based on the target value of the pressure-flow characteristic of the discharged reactant gas. However, the difference may be corrected by the second control valve whose opening degree per step is relatively small so that a control may be carried out with high precision while maintaining an excellent response time.

In yet another aspect of the invention, the reactant gas supplying unit pressurizes air to supply it as the reactant gas to a cathode side of the fuel cell.

According to the control system for a fuel cell having the above-mentioned configuration, it becomes possible to accurately control the pressure-flow characteristic of the air supplied to the cathode side of the fuel cell over the wide flow range from the low output side to the high output side of the fuel cell.

In yet another aspect of the invention, the reactant gas supplying unit reforms a fuel to produce a hydrogen-enriched reformed fuel to supply it as the reactant gas to an anode side of the fuel cell.

According to the control system for a fuel cell having the above-mentioned configuration, it becomes possible to accurately control the pressure-flow characteristic of the reformed fuel supplied to the anode side of the fuel cell over the wide flow range from the low output side to the high output side of the fuel cell.

The present invention also provides a control system for a fuel cell, including a discharged reactant gas flow control unit disposed at an outlet portion of the fuel cell. The discharged reactant gas flow control unit includes: a first control valve which is under feedforward control based on a target value of a pressure-flow characteristic of a reactant gas or a discharged reactant gas, a second control valve disposed in parallel with the first control valve, the second control valve being under feedback control based on a detected value of a pressure-flow characteristic of the reactant gas or the discharged reactant gas and having a different pressure-flow control characteristic as compared with the first control valve, wherein the first control valve and the second control valve are under digital control so that the opening degree of the first and second control valves may vary in a stepwise manner, the opening degree of the first control valve per one step being less than or equal to the maximum opening degree of the second control valve. Only the second control valve controls the flow rate of a discharged reactant gas until the flow rate exceeds a predetermined value, and the second control valve together with the first control valve controls the flow rate of the discharged reactant gas when the flow rate of the discharged reactant gas exceeds the predetermined value.

In yet another aspect of the invention, in the above-mentioned control system for a fuel cell, the opening degree of the first control valve, which corresponds to the target value of a pressure-flow characteristic of the discharged reactant gas, is determined based on information containing a pressure-flow control characteristic of the first control valve at a predetermined opening degree of the second control valve, the number of steps for the opening degree of the first control valve is an integer closest to a predetermined approximate value of the target value of a pressure-flow characteristic of the discharged reactant gas, and the second control valve corrects the difference between the opening degree of the first control valve and the predetermined approximate value by a feedback control.

The present invention also provides a control system for a fuel cell (for instance, a fuel cell 11 in the following embodiment), including: a fuel reforming unit (for instance, a reforming unit 15 in the following embodiment) which reforms a fuel (for instance, a liquid fuel) so as to produce a hydrogen-enriched reformed fuel, a fuel supply unit (for instance, a fuel supply unit 12 and the reforming unit 15 in the following embodiment) which supplies the hydrogen-enriched reformed fuel from the fuel reforming unit to the fuel cell, and a discharged fuel flow control unit (for instance, a discharged fuel flow control unit 19 in the following embodiment) disposed at an outlet portion of the fuel cell. The discharged fuel flow control unit includes a first control valve (for instance, a large flow valve 28 in the following embodiment) which is under feedforward control based on a target value of a pressure-flow characteristic of the reformed fuel or a discharged fuel (for instance, a target anode working pressure, a flow rate Q1 of a discharge gas in the following embodiment), a second control valve (for instance, a small flow valve 27 in the following embodiment) disposed in parallel with the first control valve, the second control valve being under feedback control based on a detected value of pressure-flow characteristic of the reformed fuel or the discharged fuel (for instance, a pressure P1, a pressure P2, and a flow rate Q in the following embodiment) and having a different pressure-flow control characteristic as compared with first control valve, wherein the first control valve and the second control valve are under digital control so that the opening degree of the first and second control valves may vary in a stepwise manner, the opening degree of the first control valve per one step being less than or equal to the maximum opening degree of the second control valve, only the second control valve controls the flow rate of a discharged fuel until the flow rate exceeds a predetermined value, and the second control valve together with the first control valve controls the flow rate of the discharged fuel when the flow rate of the discharged fuel exceeds the predetermined value.

According to the control system for a fuel cell having the above-mentioned configuration, in the low flow rate region of the discharged fuel, for instance, only the second control valve having a relatively small flow control capacity is used to control the flow and, in the high flow rate of the discharged fuel, the first control valve having a relatively large flow control capacity is used in addition to the second control valve to carry out a pressure-flow control of the discharged fuel over the entire output range of the fuel cell in an accurate and quick manner.

Also, when a stepping motor having a predetermined number of steps is used as a driving source for the first and second control valves, the first control valve whose opening degree per one step is large is feedforward controlled and the second control valve whose opening degree per one step is small is feedback controlled.

In the low flow rate region of the discharged fuel, the first control valve is totally closed and only the second control valve is used to control the pressure-flow characteristic of the fuel so that the accuracy to a response may be enhanced.

On the other hand, in the high flow rate region of the discharged fuel, the first control valve is subjected to a feedforward control so that the pressure-flow characteristic may be largely varied and, in addition to that, the second control valve is subjected to a feedback control to make adjustment to the change made by the first control valve. In this manner, it becomes possible to prevent a decrease in accuracy to a response in the high flow rate region of the discharged fuel.

In accordance with another aspect of the invention, the first control valve and the second control valve are under digital control so that the opening degree of the first and second control valves may vary in a stepwise manner, the opening degree of the first control valve per one step is less than or equal to the maximum opening degree of the second control valve, and the first control valve is under feedforward control based on a target value of a pressure-flow characteristic of the reformed fuel or the discharged fuel; and the second control valve is under feedback control based on a detected value of a pressure-flow characteristic of the reformed fuel or the discharged fuel.

In yet another aspect of the invention, the opening degree of the first control valve (for instance, an opening degree SPLBS of the large flow valve 28 in the following embodiment), which corresponds to the target value of a pressure-flow characteristic of the discharged fuel, is determined based on information (for instance, MAP 1 in the following embodiment) containing a pressure-flow control characteristic of the first control valve at a predetermined opening degree of the second control valve (for instance, a half of the maximum opening degree of the small flow valve 27 in the following embodiment), the number of steps for the opening degree of the first control valve is an integer closest to a predetermined approximate value of the target value of a pressure-flow characteristic of the discharged fuel, and the second control valve corrects the difference (for instance, a decimal number in the following embodiment) between the opening degree of the first control valve and the predetermined approximate value by a feedback control.

According to the control system for a fuel cell having the above-mentioned configuration, in the high flow region of the discharged fuel, for instance, the opening degree of the second control valve may be set at about a half of its maximum opening degree so that it becomes possible to correct in a quick manner the control of the first control valve whose opening degree per one step is relatively large.

In the above mentioned case, there may be a difference between the opening degree of the first control valve whose opening degree per one step is relatively large and the opening degree determined by, for instance, searching through a map based on the target value of the pressure-flow characteristic of the discharged fuel. However, the difference may be corrected by the second control valve whose opening degree per step is relatively small so that a control may be carried out with high precision while maintaining an excellent response time.

The present invention also provides a control system for a fuel cell, including: an air pressurizing unit which pressurizes air to produce pressurized air; a pressurized air supply unit which supplies the pressurized air from the air pressurizing unit to the fuel cell; and a discharged air flow control unit disposed at an outlet portion of the fuel cell, the discharged air flow control unit including: a first control valve; and a second control valve disposed in parallel with the first control valve, the second control valve having a different pressure-flow control characteristic as compared with the first control valve, wherein only the second control valve controls the flow rate of a discharged air until the flow rate exceeds a predetermined value, and the second control valve together with the first control valve controls the flow rate of the discharged air when the flow rate of the discharged air exceeds the predetermined value.

In yet another aspect of the invention, in the above control system for a fuel cell, the first control valve and the second control valve are under digital control so that the opening degree of the first and second control valves may vary in a stepwise manner, the opening degree of the first control valve per one step is less than or equal to the maximum opening degree of the second control valve, and the first control valve is under feedforward control based on a target value of a pressure-flow characteristic of the pressurized air or the discharged air; and the second control valve is under feedback control based on a detected value of a pressure-flow characteristic of the pressurized air or the discharged air.

In yet another aspect of the invention, in the above control system for a fuel cell, the opening degree of the first control valve, which corresponds to the target value of a pressure-flow characteristic of the discharged air, is determined based on information containing a pressure-flow control characteristic of the first control valve at a predetermined opening degree of the second control valve, the number of steps for the opening degree of the first control valve is an integer closest to a predetermined approximate value of the target value of a pressure-flow characteristic of the discharged air, and the second control valve corrects the difference between the opening degree of the first control valve and the predetermined approximate value by a feedback control.

The present invention also provides a control system for a fuel cell including: a fuel reforming unit which reforms a fuel so as to produce a hydrogen-enriched reformed fuel; a fuel supply unit which supplies the hydrogen-enriched reformed fuel from the fuel reforming unit to an anode side of the fuel cell; an air pressurizing unit which pressurizes air to produce pressurized air; a pressurized air supply unit which supplies the pressurized air from the air pressurizing unit to a cathode side of the fuel cell; and a plurality of discharged fuel flow control unit disposed at outlet portions of the fuel cell, the discharged fuel flow control unit including: a first control valve; and a second control valve disposed in parallel with the first control valve, the second control valve having a different pressure-flow control characteristic as compared with the first control valve, wherein only the second control valve controls the flow rate of a discharged fuel or a discharged air until the flow rate exceeds a predetermined value, and the second control valve together with the first control valve controls the flow rate of the discharged fuel or the discharged air when the flow rate of the discharged fuel or the discharged air exceeds the predetermined value.

In yet another aspect of the present invention, in the above control system for a fuel cell, the first control valve and the second control valve are under digital control so that the opening degree of the first and second control valves may vary in a stepwise manner, the opening degree of the first control valve per one step is less than or equal to the maximum opening degree of the second control valve, and the first control valve is under feedforward control based on a target value of a pressure-flow characteristic of one of the reformed fuel, pressurized air, discharged fuel, and discharged air; and the second control valve is under feedback control based on a detected value of pressure-flow characteristic of one of the reformed fuel, pressurized air, discharged fuel, and discharged air.

In yet another aspect of the present invention, in the above control system for a fuel cell, the opening degree of the first control valve, which corresponds to the target value of a pressure-flow characteristic of one of the reformed fuel, pressurized air, discharged fuel, and discharged air, is determined based on information containing a pressure-flow control characteristic of the first control valve at a predetermined opening degree of the second control valve, the number of steps for the opening degree of the first control valve is an integer closest to a predetermined approximate value of the target value of a pressure-flow characteristic of one of the reformed fuel, pressurized air, discharged fuel, and discharged air, and the second control valve corrects the difference between the opening degree of the first control valve and the predetermined approximate value by a feedback control.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof.

Figure 1:
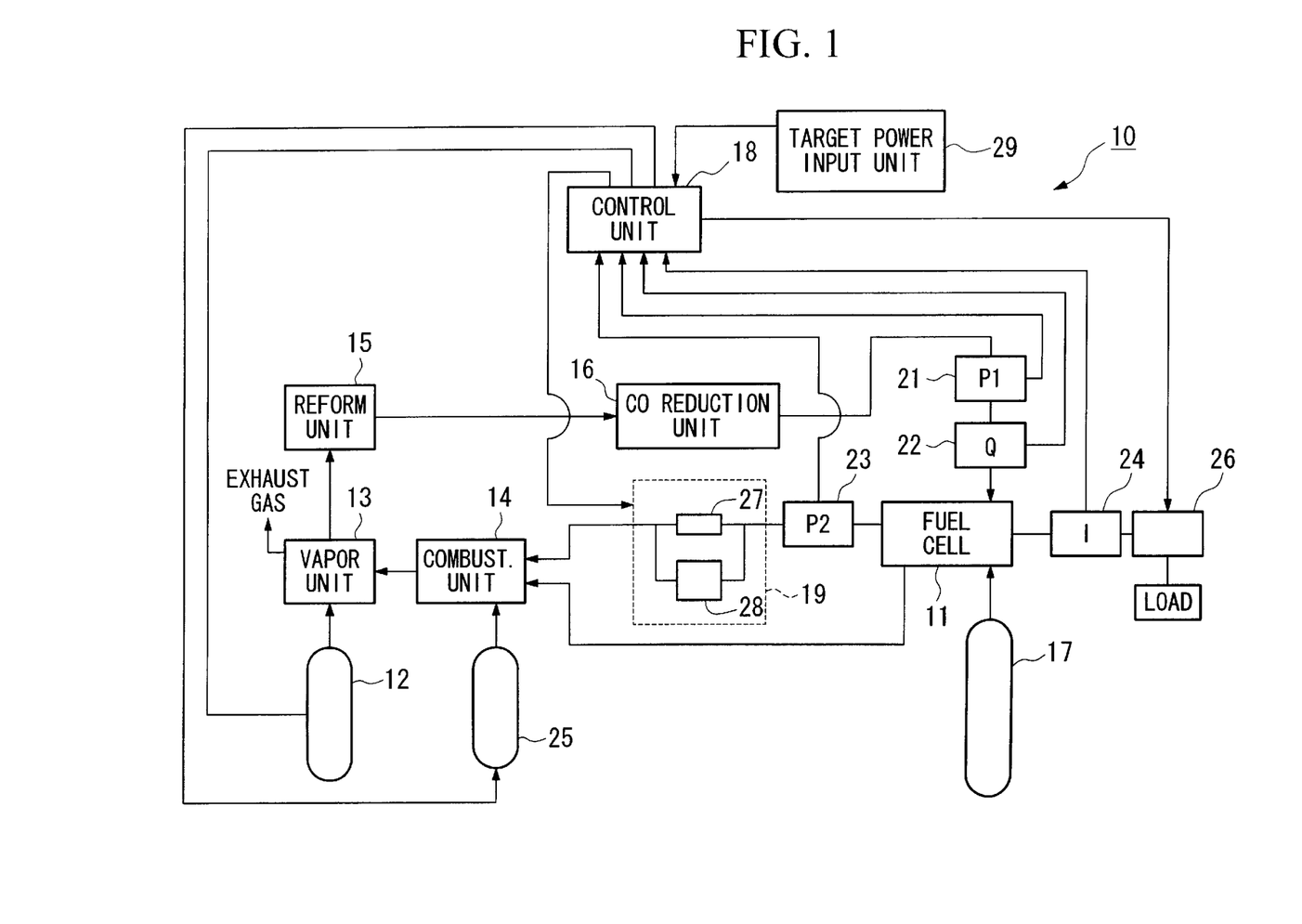
FIG. 1 is a diagram showing a schematic configuration of a control system for a fuel cell according to an embodiment of the present invention.

FIG. 1 is a diagram showing a schematic configuration of a control system 10 for a fuel cell according to an embodiment of the present invention.

The control system 10 for a fuel cell according to this embodiment of the present invention includes a fuel cell 11, a fuel supply unit 12, a vapor generation unit 13, a combustion unit 14, a reforming unit 15, a CO reduction unit 16, an oxidizing agent supply unit 17, a control unit 18, a discharged fuel flow control unit 19, a reformed fuel pressure detection unit 21, a reformed fuel flow detection unit 22, a discharged fuel pressure detection unit 23, a generated electric current detection unit 24, an auxiliary fuel supply unit 25, an output control unit 26, a discharged fuel flow control unit 19 including a small flow valve 27 and a large flow valve 28, and a target power generation input unit 29. The fuel supply unit 12 supplies a liquid fuel made of, for instance, a mixture of methanol and water. The vapor generation unit 13 produces a fuel vapor by vaporizing the liquid fuel. The combustion unit 14 produces a combustion gas which is utilized for a hot air supplied to the vapor generation unit 13 and for vaporizing the liquid fuel. The reforming unit 15 produces a hydrogen-enriched reformed fuel from the fuel vapor. The CO reduction unit 16 removes carbon monoxide contained in the reformed fuel by selectively oxidizing it. The oxidizing agent supply unit 17 supplies an oxidizing agent, such as air, to the fuel cell 11.

The fuel cell 11 includes a stack which is formed by a plurality of laminated cells, and in each cell a solid polymer electrolyte membrane made of, for instance, a solid polymer-ion exchange membrane, is sandwiched by an anode and a cathode. The fuel cell 11 includes a fuel electrode (i.e., a hydrogen electrode) to which hydrogen is supplied as a fuel and an air electrode to which, for instance, air containing oxygen is supplied as an oxidizing agent.

Each of the fuel electrode and the air electrode has an outlet for discharging unreacted fuel or oxidizing agent and each outlet is connected to the combustion unit 14 via pipe arrangement.

The fuel supply unit 12 supplies a liquid fuel to the vapor generation unit 13. The liquid fuel may be prepared by, for instance, mixing a fuel made of an alcohol type compound, such as methanol, or a hydrocarbon type compound, such as ethane, methane, or gasoline, with water at a predetermined ratio.

The vapor generation unit 13 has means for supplying the liquid fuel, such as a nozzle, and the liquid fuel sprayed from such means is vaporized by heat generated from a combustion gas which is supplied from the combustion unit 14.

The combustion unit 14 includes, for instance, a nozzle and an ignition source, and a catalyst for combustion is provided with the combustion unit 14. The nozzle is used for introducing a discharged fuel, which contains an unreacted hydrogen discharged from the fuel electrode of the fuel cell, and a discharged oxidizing agent, which contains an unreacted oxygen discharged from the air electrode to the combustion unit 14. The catalyst for combustion is used for stabilizing a combustion state of the discharged fuel and the discharged oxidizing agent. The ignition source of the combustion unit 14 may be an electric heater. The combustion gas generated by the combustion of the discharged fuel and the discharged oxidizing agent is supplied to the vapor generation unit 13.

Also, an auxiliary fuel supply unit 25 may be provided with the combustion unit 14. A combustion gas, which is utilized for hot air for the combustion unit 14 and for vaporizing the liquid fuel in the vapor generation unit 13, may be produced by burning an auxiliary fuel supplied from the auxiliary fuel supply unit 25.

In the reforming unit 15, a reforming catalyst, for instance, is provided so that a reformed fuel having a high content of hydrogen (i.e., a hydrogen-enriched fuel) may be produced from the fuel vapor by a reaction catalyzed by the reforming catalyst.

For instance, if a fuel vapor containing a mixture of methanol and water is used, a reformed fuel containing hydrogen, water, and carbon monoxide is produced as shown in the following reaction formulae (1) through (3).

$$CH_3OH + H_2O \rightarrow 3H_2 + CO_2 \tag{1}$$

$$CH_3OH + 2O_2 \rightarrow 2H_2O + CO_2 \tag{2}$$

$$CH_3OH \rightarrow 2H_2 + CO \tag{3}$$

A reforming reaction between methanol and water is expressed in the formula (1) and hydrogen which is used as a fuel later on is produced. An oxidation reaction of methanol is expressed in the formula (2) and supplies calories required by the above reaction (1) which is an endothermic reaction.

An inevitable decomposing reaction of methanol is expressed in the formula (3) in which carbon monoxide is produced. Since carbon monoxide causes a catalyst poisoning of, for instance, a Pt catalyst contained in the fuel cell 11 and decreases the generation efficiency and the lifetime of the fuel cell 11, it is removed by means of the CO reduction unit 16.

The CO reduction unit 16 includes a selective oxidation catalyst made of, for instance, Pt or Ru and removes carbon monoxide contained in the reformed fuel by selectively oxidizing carbon monoxide as shown in the following reaction formula (4):

$$2CO + O_2 \rightarrow 2CO_2 \tag{4}$$

The reformed fuel in which the content of carbon monoxide is reduced is supplied to the fuel electrode of the fuel cell 11.

The oxidizing agent supply unit 17 may include, for instance, an air compressor (not shown in the figures) and pressurizes, for example, air containing oxygen as an oxidizing agent based on a control signal from the control unit 18 and supplies the pressurized air to the air electrode of the fuel cell 11.

In the fuel cell 11, hydrogen (i.e., a fuel) in the reformed fuel and the oxidizing agent (i.e., oxygen) are electrochemically reacted to generate electricity.

The control unit 18 controls the flow rate of the discharged fuel in the discharged fuel flow control unit 19 in accordance with a command based on, for example, the operation of an accelerator pedal of an electric vehicle.

For this reason, the control unit 18 receives a signal from the reformed fuel pressure detection unit 21, which detects a pressure P1 of the reformed fuel supplied to the fuel cell 11 from the CO reduction unit 16; a signal from the reformed fuel flow detection unit 22, which detects a flow rate, Q, of the reformed fuel supplied to the fuel cell 11; a signal from the discharged fuel pressure detection unit 23, which detects a pressure P2 of the discharged fuel discharged from the fuel cell 11; a signal from the generated electric current detection unit 24, which detects an electric current, I, generated in the fuel cell 11; and a signal indicating a target power generation magnitude from the target power generation input unit 29.

The control unit 18 then outputs, for instance, a fuel injection command value to the fuel supply unit 12 and the auxiliary fuel supply unit 25 and an electric power command value to the output control unit 26 to carry out an output control against a load. The output control unit 26 may include, for instance, a DC-DC converter, an inverter, and so forth.

The discharged fuel flow control unit 19 may include a plurality of valves having different pressure-flow control characteristics. The plurality of valves may be arranged in parallel. As an example, as shown in FIG. 1, the discharged fuel flow control unit 19 includes a small flow valve 27 and a large flow valve 28 arranged in parallel.

The valves 27 and 28 may be driven by such means as a stepping motor so that the opening degree of the valves 27 and 28 may be adjusted stepwise to a predetermined degree. The opening degree of the large flow valve 28 per one step of the motor may be predetermined to be smaller than the maximum opening degree of the small valve 27.

Thus, a pressure-flow control valve for rough adjustment (i.e., the large flow valve 28) whose opening degree per one step of the motor is relatively large may be subjected to a feedforward control and a pressure-flow control valve for fine adjustment (i.e., the small flow valve 27) whose opening degree per one step of the motor is relatively small may be subjected to a feedback control such as a PID control.

In a low flow rate region of the discharged fuel, the large flow valve 28 is totally closed and the pressure-flow characteristic of the discharged fuel is controlled only by the small flow valve 27.

On the other hand, in a high flow rate region of the discharged fuel, the pressure-flow characteristic of the discharged fuel may be varied, in a relatively large magnitude, by the feedforward control of the large flow valve 28, and then by the feedback control of the small flow valve 27 so as to finely correct the pressure-flow characteristic of the discharged fuel.

Next, the operation of the control system 10 for a fuel cell according to an embodiment of the present invention having the above-mentioned configuration will be explained with reference to the accompanying drawings.

Figure 2:
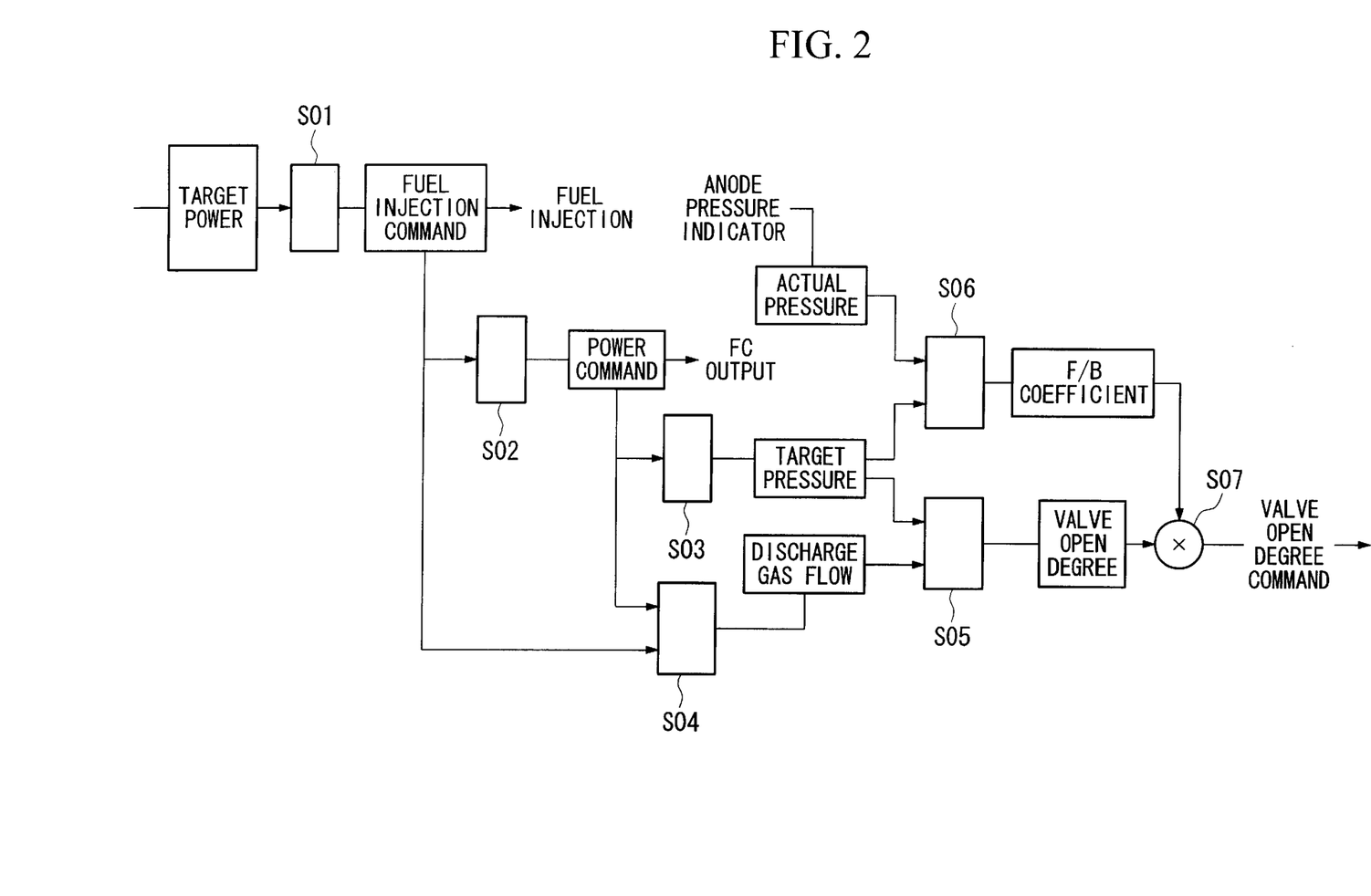
FIG. 2 is a flowchart showing processes for computing a pressure-flow control command for a discharged fuel flow control unit shown in FIG. 1.
Figure 3:
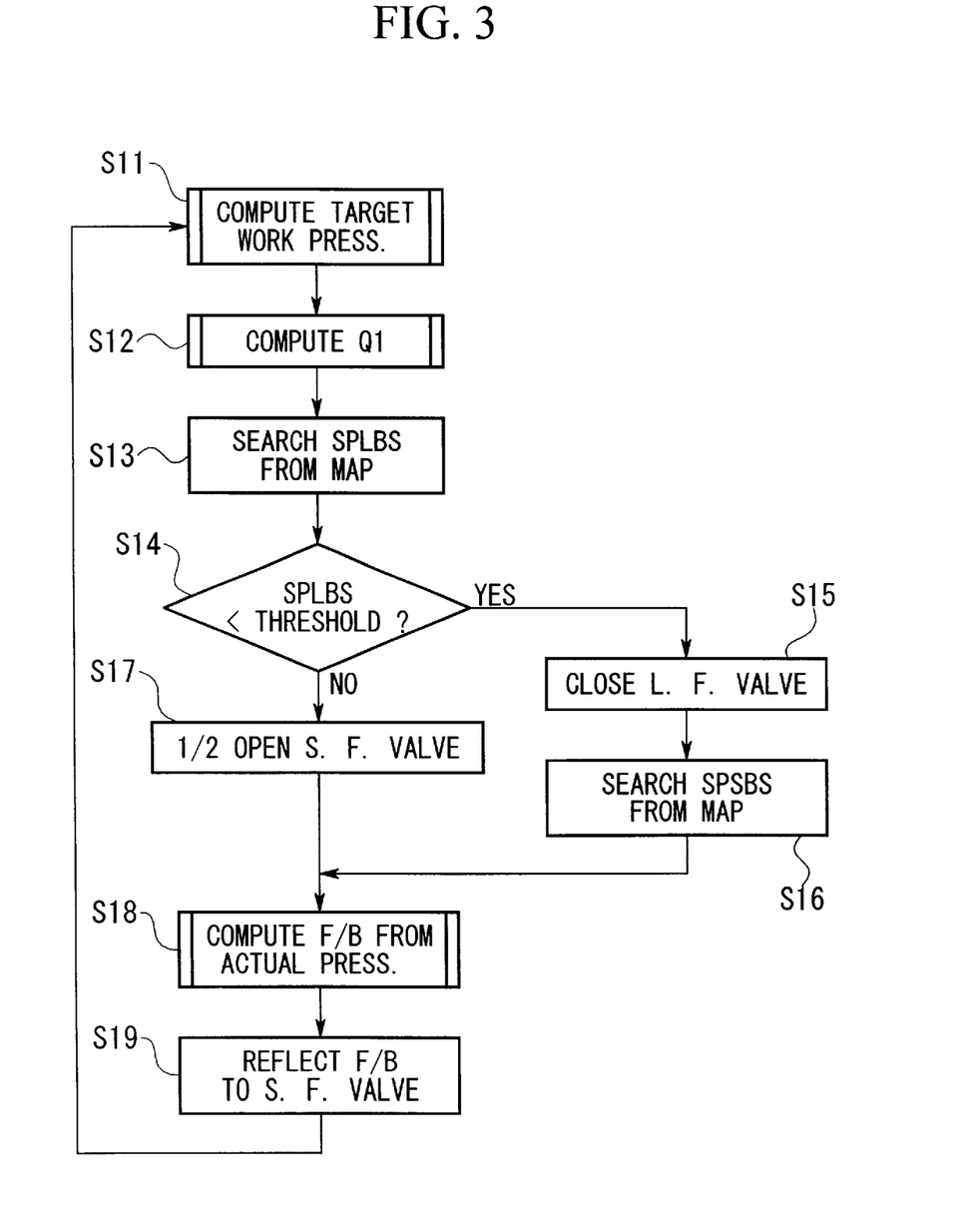
FIG. 3 is a flowchart for explaining processes for controlling a small flow valve and a large flow valve of the discharged fuel flow control unit shown in FIG. 1.
Figure 4:
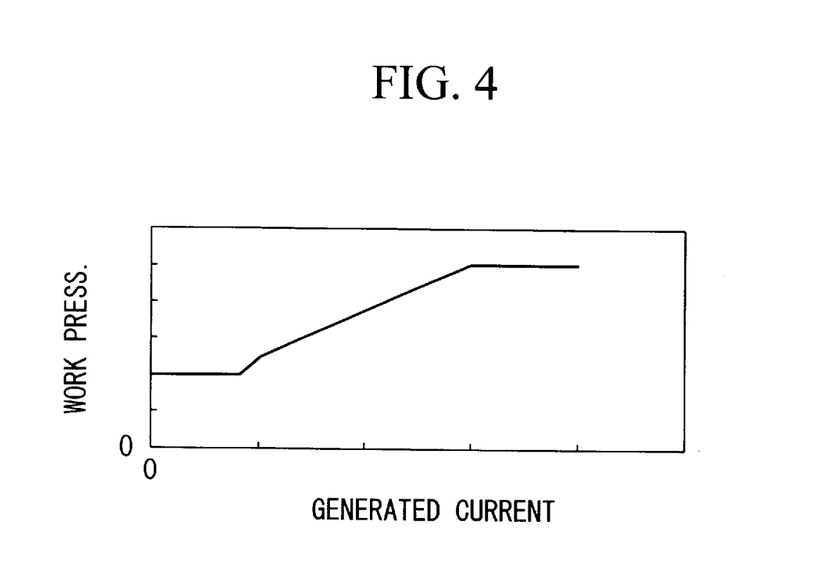
FIG. 4 is a graph showing the relationship between an electric current output from the fuel cell shown in FIG. 1 and the anode working pressure.
Figure 5:
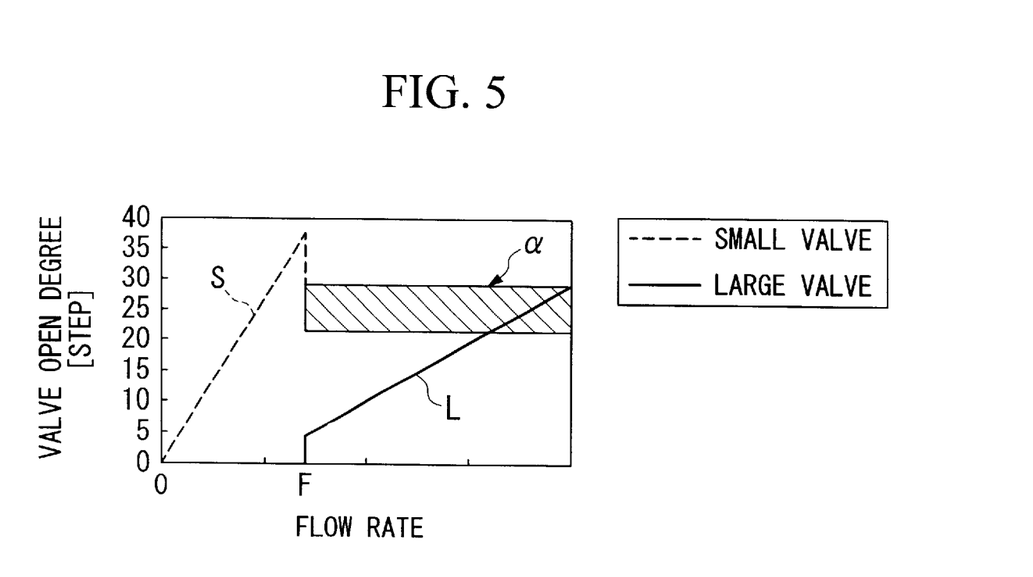
FIG. 5 is a graph showing the relationship between the flow rate of a discharged fuel, which passes through the discharged fuel flow control unit shown in FIG. 1, and the opening degree of the small flow valve and that of the large flow valve.

FIG. 2 is a flowchart showing processes for computing a pressure-flow control command for the discharged fuel flow control unit 19. FIG. 3 is a flowchart for explaining processes for controlling the small flow valve 27 and the large flow valve 28 of the discharged fuel flow control unit 19. FIG. 4 is a graph showing the relationship between the electric current output from the fuel cell 11 and the anode working pressure. FIG. 5 is a graph showing the relationship between the flow rate of a discharged fuel which passes through the discharged fuel flow control unit 19 and the opening degree of the small flow valve 27 and that of the large flow valve 28.

In step S01 shown in FIG. 2, the amount of fuel injection is computed from the target current generation value (i.e., the target power generation magnitude) which corresponds, for instance, to the magnitude of operation of an accelerator pedal, and outputs the amount of fuel injection as a fuel injection command to, for instance, the fuel supply unit 12 and the auxiliary fuel supply unit 25.

Also, in step S02, an electric power command is computed from the fuel injection command and output to, for instance, the DC-DC converter or the inverter (not shown in figures) to control the electric power output from the fuel cell 11.

In step S03, a target anode working pressure (i.e., the target pressure in FIG. 2) is computed based on the electric power command. Note that the target anode working pressure is a value relating to the difference between the pressure of a reformed fuel supplied to the fuel cell 11 and the pressure of a discharged fuel discharged from the fuel cell 11. As shown in FIG. 4, for instance, the target anode working pressure is predetermined in relation to the electric power output from the fuel cell 11.

Also, in step S04, the flow rate of the discharged fuel, i.e., a discharge gas, is calculated based on the fuel injection command and the electric power command.

In step S05, as will be described later, the opening degree of the small flow valve 27 and that of the large flow valve 28 of the discharged fuel flow control unit 19 are computed by searching a predetermined map, which contains information on the pressure and the flow rate of fuel, based on the target anode working pressure and the flow rate of the discharge gas.

In step S06, as will be described later, a feedback coefficient for the opening degree of the small flow valve 27 is particularly computed from the pressure P1 (i.e., the actual pressure which is output from the anode pressure indicator shown in FIG. 2) of the reformed fuel detected by the reformed fuel pressure detection unit 21 and the target anode working pressure.

In step S07, as will be described later, in the low flow rate region of the discharged fuel, zero is output for the opening degree of the large flow valve 28 and a value computed by the feedback control is output as the opening degree of the small flow valve 27.

On the other hand, in the high flow rate region of the discharged fuel, an opening degree of the large flow valve 28 based on the feedforward control, and an opening degree of the small flow valve 27 computed by the feedback control so as to correct the opening degree of the large flow valve 28 are output as a valve opening degree command.

Next, processes for controlling the opening degree of the small flow valve 27 and the large flow valve 28 of the discharged fuel flow control unit 19 will be described with reference to FIG. 3.

In step S11, a target working pressure (for instance, a target anode working pressure) is computed and, in step S12, the flow rate, Q1, of a discharge gas (for instance, the flow rate Q1 of a discharge gas at the anode side) is computed.

In step S13, the opening degree SPLBS of the large flow valve 28 is searched through the MAP 1 containing information of opening degree of the valve 28, which is varied depending on the flow rate and the pressure, based on the target working pressure and the flow rate Q1 of the discharge gas.

In step S14, it is determined if the opening degree SPLBS of the large flow valve 28 is smaller than a predetermined threshold value.

If the determination result is "NO", i.e., if it is determined that the flow rate of the discharged fuel is in the high flow rate region, a process of step S17 (to be described later) is carried out. On the other hand, if the determination result is "YES", i.e., if it is determined that the flow rate of the discharged fuel is in the low flow rate region, a process of step S15 is carried out and the large flow valve 28 is totally closed.

Then, in step S16, the opening degree SPSBS of the small flow valve 27 is searched through the MAP 2 containing information of opening degree, which varies depending on the flow rate and the pressure, based on the target working pressure and the flow rate Q1 of the discharge gas, and proceeds to step S18.

In step S17, the small flow valve 27 is opened to a predetermined degree, for instance, a half of its maximum opening degree, and proceeds to step S18.

In step S18, a feedback coefficient is computed based on the pressure P1 (i.e., an actual pressure) of the reformed fuel detected by the reformed fuel pressure detection unit 21 and the target working pressure.

After that, in step S19, the opening degree of the small flow valve 27 is subjected to a feedback control such as a PID control.

Note that the MAP 1 contains information on the changes in the pressure-flow rate control characteristic of the large flow valve 28 according to its opening degree at a predetermined opening degree of the small flow valve 27 which has been set in step S17. Also, the MAP 2 contains information on the changes in the pressure-flow rate control characteristic of the small flow valve 27 according to its opening degree when the large flow valve is totally closed.

For example, as shown in FIG. 5, the opening degree of the large flow valve 28 (indicated by the solid line, L) is zero (i.e., the valve 28 is totally closed) in the low flow rate region until the flow rate of the discharged fuel, which passes through the discharged fuel flow control unit 19, reaches a predetermined flow rate, F, (refer to FIG. 5), and the flow rate and the back pressure of the discharged fuel, i.e., the pressure of the discharged fuel at the fuel cell 11 side, are adjusted by the feedback control of the opening degree of the small flow valve 27 (indicated by the solid line S in FIG. 5), which is varied in a stepwise manner.

On the other hand, the opening degree of the large flow valve 28 (indicated by the solid line, L) is varied stepwise by a feedforward control thereof in the high flow rate region in which the flow rate exceeds a predetermined flow rate, F, so that the flow rate and the back pressure of the discharged fuel, i.e., the pressure of the discharged fuel at the fuel cell 11 side, may be adjusted in a relatively rough manner. At that time, the opening degree of the small valve 27 may be set at approximately a half of its maximum opening degree so that the target anode working pressure and the flow rate Q1 of the discharge gas may be accurately and quickly obtained, in accordance with the changes in the opening degree of the large flow valve 28 per one step, by a feedback control of the small flow valve 27 which enables a fine adjustment of the opening degree of the valve, as indicated by the shaded area α in FIG. 5.

That is, when the opening degree SPLBS of the large flow valve 28, which varies in a stepwise manner, is searched through the map, the number of steps for the valve 28 may be obtained as an integer and a decimal number, which may be approximated by, for instance, rounding off, and may be corrected by adjusting the opening degree of the small valve 27.

Note that the feedforward control of the large flow valve 28 enables minimizing adverse effects caused by a disturbance as compared with a feedback control thereof.

As mentioned above, in the control system 10 for a fuel cell according to an embodiment of the present invention, the small flow valve 27 and the large flow valve 28 having different pressure-flow characteristics are arranged in parallel. The large flow valve 28 is subjected to a feedforward control and the small flow valve 27 is subjected to a feedback control so that a highly accurate control of the fuel may be achieved while maintaining a high response function (i.e., a short response time).

Figure 6:
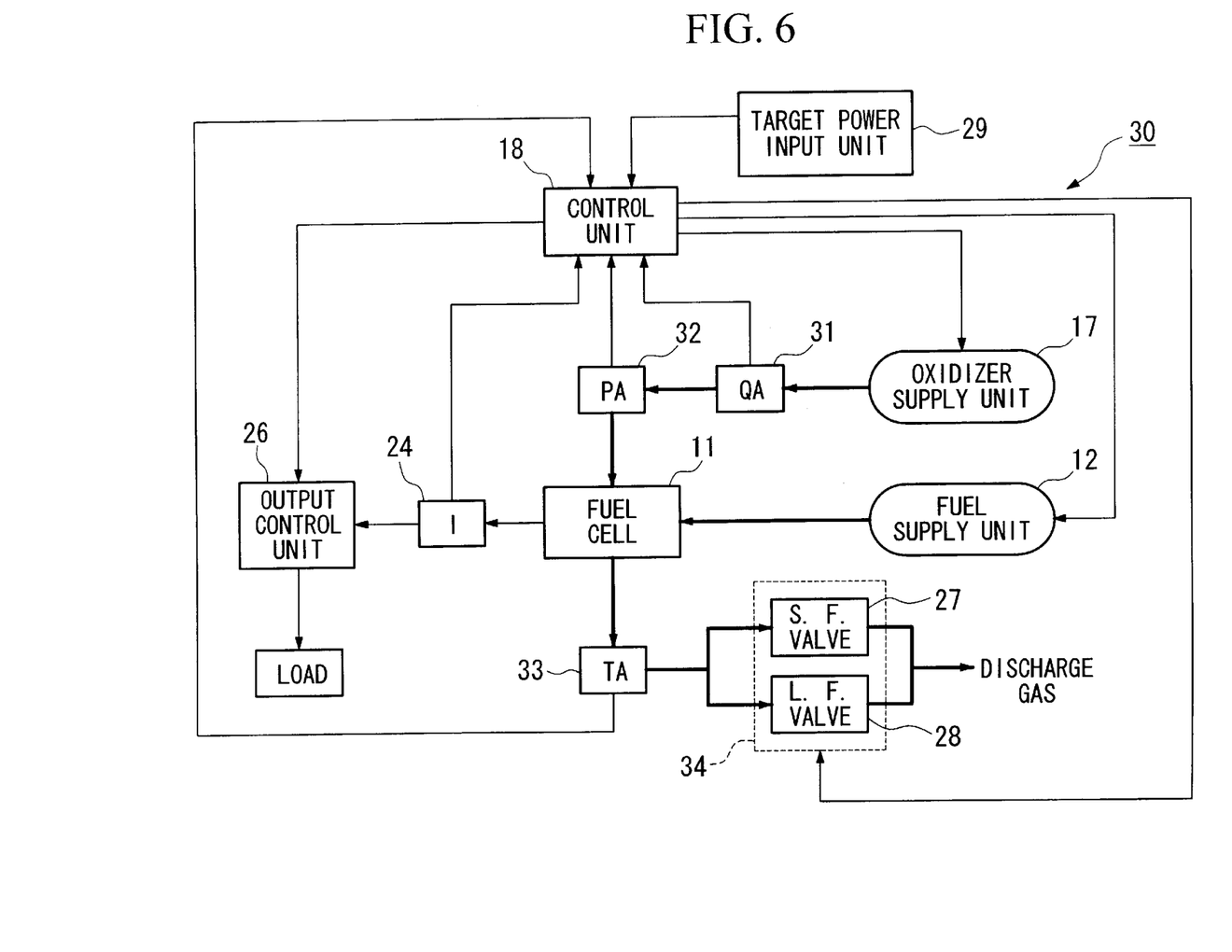
FIG. 6 is a diagram showing the configuration of a control system for a fuel cell, especially, the structure of an oxidizing agent supplying system, according to a modified embodiment of the present invention.

Although the small flow valve 27 and the large flow valve 28 having a different pressure-flow characteristic each other are disposed in parallel in the proximity of the outlet for discharging an unreacted fuel from the fuel cell 11 in the above-described embodiment, it is not limited as such and, for instance, the small flow valve 27 and the large flow valve 28 having a different pressure-flow characteristic may be disposed in parallel in the proximity of the outlet for discharging an unreacted oxidizing agent from the fuel cell 11 as indicated in a control system 30 for a fuel cell according to a modification of the above-described embodiment shown in FIG. 6.

Figure 7:
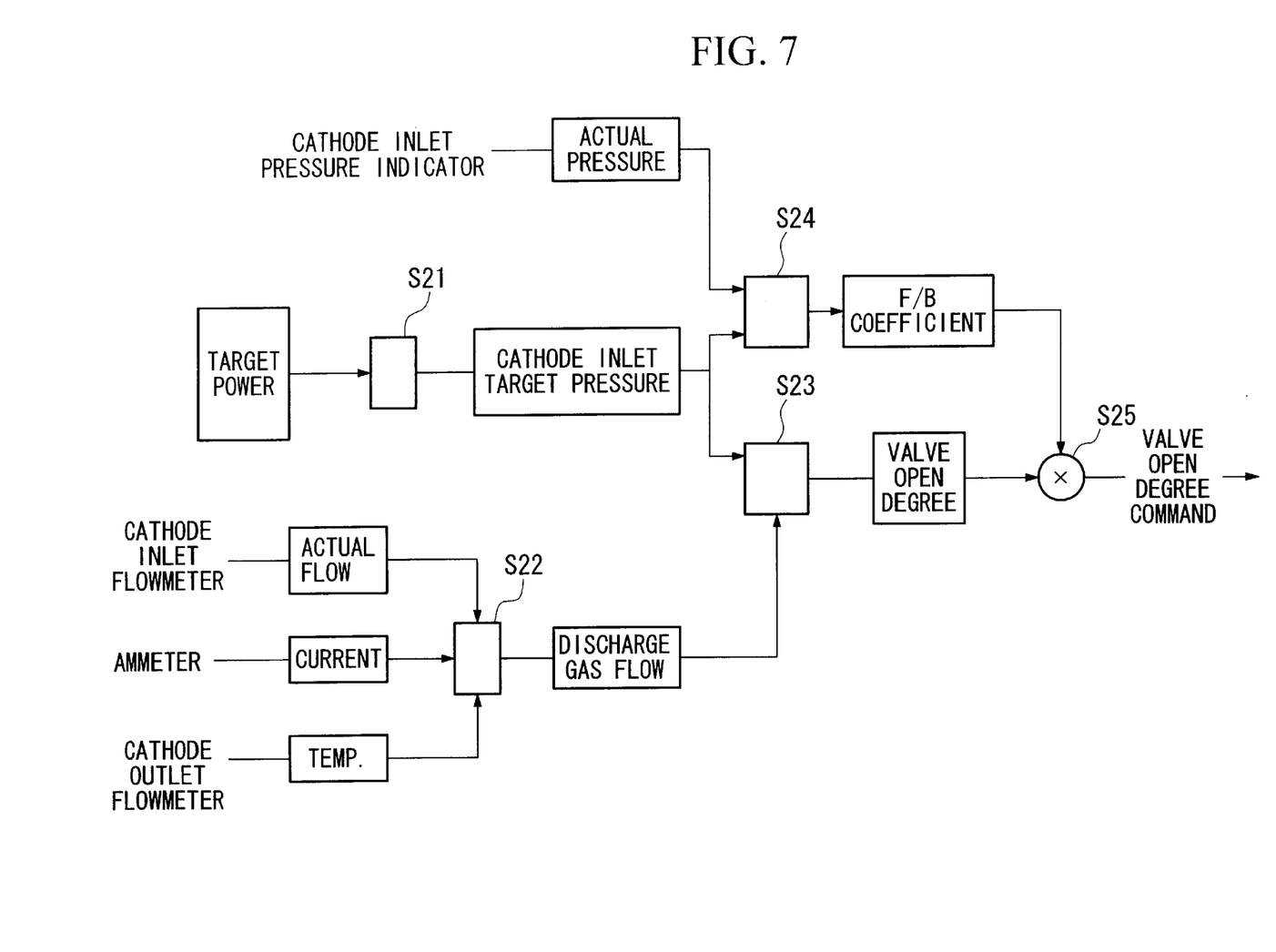
FIG. 7 is a flowchart for explaining processes for calculating a pressure-flow control command for a discharged oxidizing agent flow control unit shown in FIG. 6.

Next, the control system 30 according to the modification of the above embodiment will be explained in detail with reference to the accompanied drawings. FIG. 6 is a diagram showing the configuration of the control system 30 for a fuel cell, especially, the structure of the oxidizing agent supplying system, according to the modification of an embodiment of the present invention. FIG. 7 is a flowchart for explaining processes for calculating the pressure-flow control command for a discharged oxidizing agent flow control unit 34.

Note that in FIGS. 6 and 7, the same numerals are used for the parts substantially the same as the control system 10 for a fuel cell according to the above-mentioned embodiment and the explanation thereof is omitted.

The control system 30 for a fuel cell includes an oxidizing agent flow detection unit 31, an oxidizing agent pressure detection unit 32, a discharged oxidizing agent temperature detection unit 33, and the discharged oxidizing agent flow control unit 34. The oxidizing agent flow detection unit 31 detects the flow QA of an oxidizing agent (eg., air containing oxygen), which is supplied to the air electrode of the fuel cell 11 from the oxidizing agent supply unit 17. The oxidizing agent pressure detection unit 32 detects the pressure PA of the oxidizing agent which is supplied to the air electrode of the fuel cell 11. The discharged oxidizing agent temperature detection unit 33 detects the temperature TA of the discharged oxidizing agent which is discharged from the fuel cell 11. The discharged oxidizing agent flow control unit 34 includes a plurality of valves, each having a different pressure-flow characteristic, for instance the small flow valve 27 and the large flow valve 28 which may be disposed in parallel.

The control unit 18 receives a signal from the oxidizing agent flow detection unit 31, which detects the flow QA of the oxidizing agent supplied to the air electrode of the fuel cell 11, a signal from the oxidizing agent pressure detection unit 32, which detects the pressure PA of the oxidizing agent supplied to the air electrode of the fuel cell 11, a signal from the discharged oxidizing agent temperature detection unit 33, which detects the temperature TA of the discharged oxidizing agent discharged from the fuel cell 11, a signal from the generated electric current detection unit 24, which detects a generated electric current I varied in accordance with the amount of the oxidizing agent consumed by the fuel cell 11, and a signal indicating a target power generation magnitude from the target power generation input unit 29.

The control unit 18 also calculates the target pressure of the oxidizing agent at the inlet side of the air electrode based on the target power generation magnitude as described later.

Moreover, the control unit 18, as will be described later, calculates the flow of discharge gas (i.e., the flow of discharged oxidizing agent) which is discharged outside via the discharged oxidizing agent flow control unit 34 based on the flow QA of the oxidizing agent supplied to the air electrode, the generated electric current I relating to the amount of the oxidizing agent consumed by the fuel cell 11, and the temperature TA of the discharged oxidizing agent.

That is, the amount of oxidizing agent consumed by the fuel cell 11 is calculated based on the generated electric current I, and the correction of volume relative to the temperature is carried out based on the temperature TA of the discharged oxidizing agent when the flow of the discharged oxidizing agent is computed by subtracting the calculated oxidizing agent consumption from the flow QA of the oxidizing agent supplied to the air electrode.

The discharged oxidizing agent flow control unit 34 includes a plurality of valves having a different pressure-flow characteristic, for instance, the small flow valve 27 and the large flow valve 28 which may be disposed in parallel.

The valves 27 and 28 may be driven by such means as a stepping motor so that the opening degree of the valves 27 and 28 may be adjusted stepwise to a predetermined degree. For instance, the opening degree of the large flow valve 28 per one step of the motor may be predetermined to be smaller than the maximum opening degree of the small valve 27.

Thus, a pressure-flow control valve for rough adjustment (i.e., the large flow valve 28) whose opening degree per one step of the motor is relatively large may be subjected to a feedforward control, and a pressure-flow control valve for fine adjustment (i.e., the small flow valve 27) whose opening degree per one step of the motor is relatively small may be subjected to a feedback control such as a PID control.

In a low flow rate region of the discharged oxidizing agent, the large flow valve 28 may be totally closed and the pressure-flow characteristic of the discharged oxidizing agent is controlled only by the small flow valve 27.

On the other hand, in a high flow rate region of the discharged oxidizing agent, the pressure-flow characteristic of the discharged fuel may be varied, in a relatively large magnitude, by the feedforward control of the large flow valve 28, and then by the feedback control of the small flow valve 27 so as to finely correct the pressure-flow characteristic of the discharged oxidizing agent.

Next, processes for calculating a pressure-flow control command for the discharged oxidizing agent flow control unit 34 will be explained with reference to FIG. 7.

First, in step S21 shown in FIG. 7, the target pressure of the oxidizing agent at the inlet portion of the air electrode (i.e., the cathode inlet portion target pressure in FIG. 7), which is required, for instance, to secure the predetermined pressure between the fuel electrode and the air electrode of the fuel cell 11, is calculated based on the target current generation value (i.e., the target power generation magnitude) which corresponds, for instance, to the magnitude of operation of an accelerator pedal.

Also, in step S22, the flow of discharge gas (i.e., the discharged oxidizing agent) is calculated based on the flow QA of the oxidizing agent supplied to the air electrode (i.e., the actual flow output from the cathode inlet portion flowmeter shown in FIG. 7) which is detected by the oxidizing agent flow detection unit 31, the generated electric current I (i.e., the electric current output from the ammeter shown in FIG. 7) which is detected by the generated electric current detection unit 24, and the temperature TA (i.e., the temperature output from the cathode outlet portion thermometer shown in FIG. 7) which is detected by the discharged oxidizing agent temperature detection unit 33.

In step S23, the opening degree of the small flow valve 27 and that of the large flow valve 28 of the discharged oxidizing agent flow control unit 34 are computed by searching a predetermined map, which contains information on the pressure and the flow rate, based on the cathode inlet portion target working pressure and the flow rate of the discharge gas.

Also, in step S24, a feedback coefficient for the opening degree of the small flow valve 27 is particularly computed from the pressure PA (i.e., the actual pressure which is output from the cathode inlet portion pressure indicator shown in FIG. 7) of the oxidizing agent supplied to the air electrode, which is detected by the oxidizing agent pressure detection unit 32.

Then, in step S25, in the low flow rate region of the discharged oxidizing agent, zero is output for the opening degree of the large flow valve 28 and a value computed by the feedback control is output as the opening degree of the small flow valve 27.

On the other hand, in the high flow rate region of the discharged oxidizing agent, an opening degree of the large flow valve 28 based on the feedforward control, and an opening degree of the small flow valve 27 computed by the feedback control so as to correct the opening degree of the large flow valve 28 are output as a valve opening degree command.

As mentioned above, in the control system 30 for a fuel cell according to the modified embodiment of the present invention, the small flow valve 27 and the large flow valve 28 having different pressure-flow characteristics are arranged in parallel for the discharged oxidizing agent discharged from the fuel cell 11. The large flow valve 28 is subjected to a feedforward control and the small flow valve 27 is subjected to a feedback control so that a highly accurate control may be achieved while maintaining a high response function (i.e., a short response time).

Note that although the small flow valve 27 and the large flow valve 28 having a different pressure-flow characteristic each other are arranged in parallel for one of the discharged fuel and the discharged oxidizing agent from the fuel cell 11 in the control system 10 according to the embodiment of the present invention and the control system 30 according to the modified embodiment of the present invention, it is not limited as such and, for instance, the small flow valve 27 and the large flow valve 28 having a different pressure-flow characteristic may be disposed in parallel for both the discharged fuel and the discharged oxidizing agent from the fuel cell 11. That is, both the discharged fuel flow control unit 19 and the discharged oxidizing agent flow control unit 34 may be provided with the fuel cell 11.

Having thus described an exemplary embodiment of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only: the invention is limited and defined only by the following claims and equivalents thereto.

What is claimed is:

1. A control system for a fuel cell, comprising:
    a first reactant gas supplying unit which supplies a first reactant gas to said fuel cell;
    a second reactant gas supplying unit which supplies a second reactant gas to said fuel cell; and
    a discharged reactant gas flow control unit disposed at an outlet portion of said fuel cell, said discharged reactant gas flow control unit including:
        a first control valve; and
        a second control valve disposed in parallel with said first control valve, said second control valve having a different pressure-flow control characteristic as compared with said first control valve, wherein
        only said second control valve controls the flow rate of a discharged first reactant gas until the flow rate exceeds a predetermined value, and
        said second control valve together with said first control valve controls the flow rate of the discharged first reactant gas when the flow rate of the discharged first reactant gas exceeds the predetermined value.

2. A control system for a fuel cell as set forth in claim 1, wherein
    said first control valve and said second control valve are under digital control so that the opening degree of said first and second control valves may vary in a stepwise manner.

3. A control system for a fuel cell as set forth in claim 2, wherein
    the opening degree of said first control valve per one step is less than or equal to the maximum opening degree of said second control valve.

4. A control system for a fuel cell as set forth in claim 3, wherein
    said first control valve is under feedforward control based on a target value of a pressure-flow characteristic of the first reactant gas or the discharged first reactant gas.

5. A control system for a fuel cell as set forth in claim 4, wherein
    said second control valve is under feedback control based on a detected value of pressure-flow characteristic of the first reactant gas or the discharged first reactant gas.

6. A control system for a fuel cell as set forth in claim 5, wherein
    the opening degree of said first control valve, which corresponds to the target value of a pressure-flow characteristic of the discharged first reactant gas, is determined based on information containing a pressure-flow control characteristic of said first control valve at a predetermined opening degree of said second control valve.

7. A control system for a fuel cell as set forth in claim 6, wherein
    the number of steps for the opening degree of said first control valve is an integer closest to a predetermined approximate value of the target value of a pressure-flow characteristic of the discharged first reactant gas, and
    said second control valve corrects the difference between the opening degree of said first control valve and the predetermined approximate value by a feedback control.

8. A control system for a fuel cell as set forth in claim 1, wherein
    said first reactant gas supplying unit pressurizes air to supply it as said first reactant gas to a cathode side of said fuel cell.

9. A control system for a fuel cell as set forth in claim 1, wherein
    said first reactant gas supplying unit reforms a fuel to produce a hydrogen-enriched reformed fuel to supply it as said first reactant gas to an anode side of said fuel cell.

10. A control system for a fuel cell, comprising:
    a discharged reactant gas flow control unit disposed at an outlet portion of said fuel cell, said discharged reactant gas flow control unit including:
        a first control valve which is under feedforward control based on a target value of a pressure-flow characteristic of a reactant gas or a discharged reactant gas,
        a second control valve disposed in parallel with said first control valve, said second control valve being under feedback control based on a detected value of pressure-flow characteristic of the reactant gas or the discharged reactant gas and having a different pressure-flow control characteristic as compared with said first control valve, wherein said first control valve and said second control valve are under digital control so that the opening degree of said first and second control valves may vary in a stepwise manner, the opening degree of said first control valve per one step being less than or equal to the maximum opening degree of said second control valve, only said second control valve controls the flow rate of a discharged reactant gas until the flow rate exceeds a predetermined value, and said second control valve together with said first control valve controls the flow rate of the discharged reactant gas when the flow rate of the discharged reactant gas exceeds said predetermined value.

11. A control system for a fuel cell as set forth in claim 10, wherein the opening degree of said first control valve, which corresponds to the target value of a pressure-flow characteristic of the discharged reactant gas, is determined based on information containing a pressure-flow control characteristic of said first control valve at a predetermined opening degree of said second control valve, the number of steps for the opening degree of said first control valve is an integer closest to a predetermined approximate value of the target value of a pressure-flow characteristic of the discharged reactant gas, and said second control valve corrects the difference between the opening degree of said first control valve and the predetermined approximate value by a feedback control.

12. A control system for a fuel cell, comprising:

a fuel reforming unit which reforms a fuel so as to produce a hydrogen-enriched reformed fuel;

a fuel supply unit which supplies the hydrogen-enriched reformed fuel from said fuel reforming unit to said fuel cell;

an air supply unit which supplies air to said fuel cell; and a discharged fuel flow control unit disposed at an outlet portion of said fuel cell, said discharged fuel flow control unit including:

a first control valve; and a second control valve disposed in parallel with said first control valve, said second control valve having a different pressure-flow control characteristic as compared with said first control valve, wherein only said second control valve controls the flow rate of a discharged fuel discharged from said fuel cell until the flow rate exceeds a predetermined value, and said second control valve together with said first control valve controls the flow rate of the discharged fuel when the flow rate of the discharged fuel exceeds said predetermined value.

13. A control system for a fuel cell as set forth in claim 12, wherein said first control valve and said second control valve are under digital control so that the opening degree of said first and second control valves may vary in a stepwise manner, the opening degree of said first control valve per one step is less than or equal to the maximum opening degree of said second control valve, and said first control valve is under feedforward control based on a target value of a pressure-flow characteristic of the reformed fuel or the discharged fuel; and said second control valve is under feedback control based on a detected value of pressure-flow characteristic of the reformed fuel or the discharged fuel.

14. A control system for a fuel cell as set forth in claim 13, wherein the opening degree of said first control valve, which corresponds to the target value of a pressure-flow characteristic of the discharged fuel, is determined based on information containing a pressure-flow control characteristic of said first control valve at a predetermined opening degree of said second control valve, the number of steps for the opening degree of said first control valve is an integer closest to a predetermined approximate value of the target value of a pressure-flow characteristic of the discharged fuel, and said second control valve corrects the difference between the opening degree of said first control valve and the predetermined approximate value by a feedback control.

15. A control system for a fuel cell, comprising:

an air pressurizing unit which pressurizes air to produce pressurized air;

a pressurized air supply unit which supplies the pressurized air from said air pressurizing unit to said fuel cell;

a fuel supply unit which supplies fuel to said fuel cell; and a discharged airflow control unit disposed at an outlet portion of said fuel cell, said discharged air flow control unit including:

a first control valve; and a second control valve disposed in parallel with said first control valve, said second control valve having a different pressure-flow control characteristic as compared with said first control valve, wherein only said second control valve controls the flow rate of a discharged air discharged from said fuel cell until the flow rate exceeds a predetermined value, and said second control valve together with said first control valve controls the flow rate of the discharged air when the flow rate of the discharged air exceeds said predetermined value.

16. A control system for a fuel cell as set forth in claim 15, wherein said first control valve and said second control valve are under digital control so that the opening degree of said first and second control valves may vary in a stepwise manner, the opening degree of said first control valve per one step is less than or equal to the maximum opening degree of said second control valve, and said first control valve is under feedforward control based on a target value of a pressure-flow characteristic of the pressurized air or the discharged air; and said second control valve is under feedback control based on a detected value of pressure-flow characteristic of the pressurized air or the discharged air.

17. A control system for a fuel cell as set forth in claim 16, wherein the opening degree of said first control valve, which corresponds to the target value of a pressure-flow characteristic of the discharged air, is determined based on information containing a pressure-flow control characteristic of said first control valve at a predetermined opening degree of said second control valve, the number of steps for the opening degree of said first control valve is an integer closest to a predetermined approximate value of the target value of a pressure-flow characteristic of the discharged air, and said second control valve corrects the difference between the opening degree of said first control valve and the predetermined approximate value by a feedback control.

18. A control system for a fuel cell as set forth in claim 15, further comprising:

a fuel reforming unit which reforms a fuel so as to produce a hydrogen-enriched reformed fuel and supplies the hydrogen-enriched reformed fuel to said fuel supply unit; and a discharged fuel flow control unit disposed at a second outlet portion of said fuel cell, said discharged fuel flow control unit including:

a first control valve; and a second control valve disposed in parallel with said first control valve, said second control valve having a different pressure-flow control characteristic as compared with said first control valve, wherein only said second control valve controls the flow rate of a discharged fuel discharged from said fuel cell until the flow rate exceeds a predetermined value, and said second control valve together with said first control valve controls the flow rate of the discharged fuel when the flow rate of the discharged fuel exceeds said predetermined value.

19. A control system for a fuel cell as set forth in claim 18, wherein said first control valve and said second control valve of said second discharged fuel flow control unit are under digital control so that the opening degree of said first and second control valves of said second discharged fuel flow control unit may vary in a stepwise manner, the opening degree of said first control valve of said second discharged fuel flow control unit per one step is less than or equal to the maximum opening degree of said second control valve of said second discharged fuel flow control unit, and said first control valve of said second discharged fuel flow control unit is under feedforward control based on a target value of a pressure-flow characteristic of the reformed fuel, or the discharged fuel; and said second control valve of said second discharged fuel flow control unit is under feedback control based on a detected value of pressure-flow characteristic of the reformed fuel, or the discharged fuel.

20. A control system for a fuel cell as set forth in claim 19, wherein the opening degree of said first control valve of said second discharged fuel flow control unit, which corresponds to the target value of a pressure-flow characteristic of the reformed fuel, or the discharged fuel is determined based on information containing a pressure-flow control characteristic of said first control valve of said second discharged fuel flow control unit at a predetermined opening degree of said second control valve of said second discharged fuel flow control unit, the number of steps for the opening degree of said first control valve of said second discharged fuel flow control unit is an integer closest to a predetermined approximate value of the target value of a pressure-flow characteristic of the reformed fuel, or the discharged fuel, and said second control valve of said second discharged fuel flow control unit corrects the difference between the opening degree of said first control valve of said second discharged fuel flow control unit and the predetermined approximate value by a feedback control.

* * * * *